July 31, 1962
T. N. KELLY
3,046,648
METHOD OF MANUFACTURING REPLACEABLE
LABYRINTH TYPE SEAL ASSEMBLY
Original Filed April 13, 1959
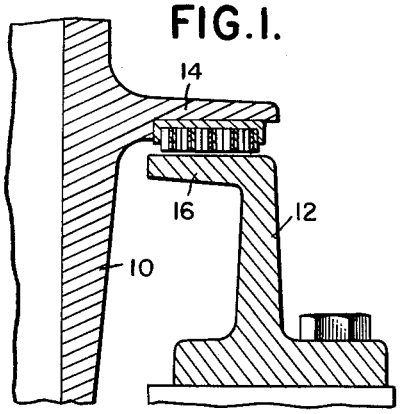
FIG.1.
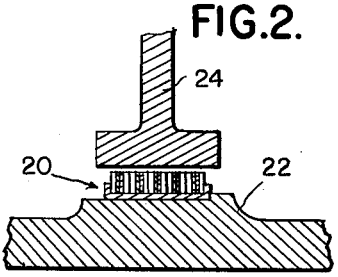
FIG.2.
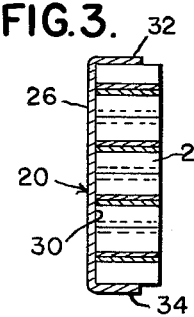
FIG.3.
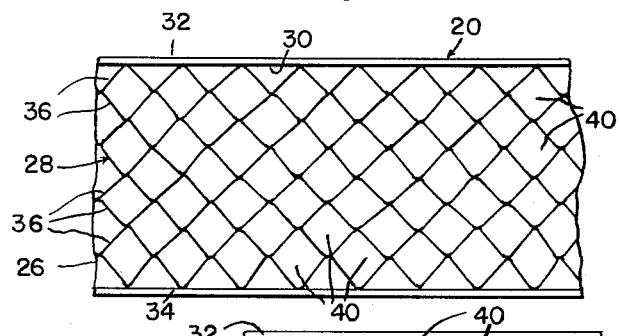
FIG.4.
FIG.6.
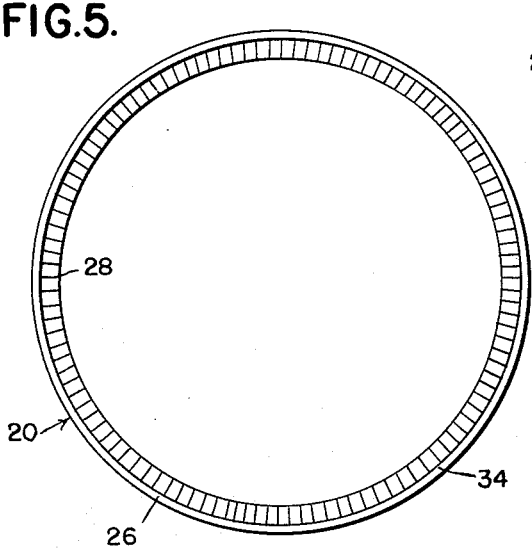
FIG.5.
*INVENTOR.*
THOMAS N. KELLY
BY
Whittemore, Hulbert & Belknap
ATTORNEYS

United States Patent Office 3,046,648
Patented July 31, 1962

3,046,648
METHOD OF MANUFACTURING REPLACEABLE LABYRINTH TYPE SEAL ASSEMBLY
Thomas N. Kelly, Detroit, Mich., assignor to Aircraft Precision Products, Inc., Oak Park, Mich., a corporation of Michigan
Original application Apr. 13, 1959, Ser. No. 805,954. Divided and this application Mar. 7, 1960, Ser. No. 13,067
6 Claims. (Cl. 29—455)

This invention relates generally to a method of manufacturing replaceable labyrinth type seal assemblies, and constitutes a division of my application filed April 13, 1959, bearing Serial No. 805,954.

Labyrinth seals are referred to as cellular and pressure seals, and are a form of seal or packing used to prevent leakage between relatively rotating, or rotating and stationary, members. They are commonly known for their use as pressure seals in axial flow compressors, turbines, and other rotating shaft equipment to prevent back flow along the shaft of the compressor, turbine or the like.

In compressors, turbines and similar rotating shaft equipment a labyrinth type seal having a multiplicity of sharp edged orifices in close but spaced contact to a relatively rotating part is highly desirable. However, it will be appreciated that in high speed and high thermal conductive equipment of the type mentioned there is a problem of thermal conductivity. High temperatures due to friction or other factors are readily transmitted to conductive materials and can cause failure by burning.

Thus far labyrinth type seals have been formed as an integral part of one of the relatively rotating members, wherein the seal is required, to avoid rather than eliminate the heat conductive problem at the base of the seal structure. To minimize the cost of such seals, both because of the integral construction required and of the problems of machining a major component part of the seal receiving equipment, the cellular formation has been required to be relatively simple. The normal form is a plurality of annular ribs of one or another cross-sectional shape. In seals of this type there is some heat dissipation in the seal forming annular fins, and such heat, as is conducted to the base of the seal, is transmitted directly into the part from which the seal structure is formed. Accordingly, failure to the seal at its junction with the part from which formed, is minimized.

Heretofore, insofar as I am aware, no one has proposed or suggested the use of a separate member having a multiplicity of separate and isolated recesses or orifices, for forming a labyrinth type seal, and a successful method of manufacture thereof.

This invention discloses a pressure seal including a honeycomb section which is suitably formed and secured to a retaining ring to provide a separate rather than integral sealing member. As a separate unit the seal is more easily installed and more readily replaced. Further, its malfunction does not require the replacement of an expensive component part but only of the relatively inexpensive seal itself. The method of manufacture employed produces a highly successful seal for its intended purpose without concern for burn-out between the seal and its retaining ring structure.

It is an object of this invention to disclose a cellular or labyrinth type pressure seal which is usable between concentric surfaces of relatively rotating parts and the like, and which comprises a replaceable separate sealing assembly rather than an integral part of a major component of the seal receiving equipment in which the seal is used.

It is another object of this invention to disclose a pressure seal comprising a preformed retainer ring and a honeycomb liner for said ring, wherein the liner has a multiplicity of separate and isolated recesses or orifices provided with sharply defined multiple outer edges having good sealing characteristics.

It is also an object of this invention to disclose a pressure seal formed from a thin-walled honeycomb structure for maximum effective heat dissipation.

Another object of this invention is to disclose a paricular effective method of forming a honeycomb section to provide a cellular seal of annular shape.

Still another object of this invention is to disclose a method of making a successful labyrinth seal separate from rather than integral with, any major component part of the seal receiving structure.

A further object of this invention is to disclose a method of securing a labyrinth-forming honeycomb section to a retainer ring with immunity to problems of burn-out and failure therebetween.

These and other objects and advantages in the practice of this invention will be more apparent upon a reading of the following specification; in conjunction with the accompanying drawing, wherein:

FIGURE 1 is a fragmentary cross-sectional view through a stationary housing and a rotating member, with the disclosed seal of this invention interposed between concentric flanges thereof and affixed to the flange of said housing, and showing parts broken away and in section.

FIGURE 2 is a fragmentary cross-sectional view through a stationary member and a rotating shaft, with the disclosed seal of this invention interposed between concentric portions thereof and affixed to the rotating shaft, and showing parts broken away and in section.

FIGURE 3 is an enlarged cross-sectional view through the disclosed pressure seal.

FIGURE 4 is a fragmentary elevational view of the seal structure shown in FIGURE 3.

FIGURE 5 is an enlarged edge view of the pressure seal disclosed by this invention, disposed separate from any equipment in which it might be used.

FIGURE 6 is a further enlarged fragmentary elevational view of the seal structure to show the joint between abutting ends of the honeycomb member.

Referring to the drawings in further detail:

In FIGURE 1 there is shown a stationary housing 10 having a rotatable member 12 disposed next adjacent thereto. The housing member 10 includes an annular flange or collar 14, and the rotatable member 12 includes a peripheral flange 16 arranged within and concentric with said annular flange 14. Between these closely disposed but spaced flanges 14 and 16 is disposed the seal 20.

In FIGURE 2 the seal 20 is shown mounted on a rotatable shaft 22 and disposed in sealing relation to a stationary member 24 through which the rotatable shaft extends.

The two illustrated embodiments, just mentioned, disclose the seal 20 having an inner peripheral sealing surface or an external peripheral sealing face. It is also foreseeable that the sealing member 20 could be formed to have its sealing face radially disposed.

The seal 20 comprises a retaining ring 26 and a honeycomb member 28.

The retainer ring 26 is formed from strip material and is channel-shaped in cross-section. Preferably the channel formation 30 of the ring opens inwardly and includes a pair of spaced parallel annular side walls 32 and 34 between which the honeycomb member 28 is received.

The honeycomb member 28 is preformed and initially is a straight length. In the assembly illustrated, the initially straight preformed honeycomb member 28 has been curved lengthwise in the arc of a circle and is formed of separate thin or light gauge narrow corrugated strips 36 disposed at substantially right angles to the base of the channel formation 30 and arranged in parallel rows. Alternate apices of the corrugations of one strip engage and are secured to alternate apices of the corrugations of the next adjacent strip, as at 38. This forms a multiplicity of separate and individual diamond-shaped cells or orifices 40 having flush sharply defined outer edges which are disposed outwardly beyond the edges of the side walls 32 and 34 of the channel formation and have good sealing characteristics.

The honeycomb member 28 is preferably formed so that it will fit snugly between the side walls 32 and 34 of the channel formation 30 of the retainer ring, and alternate apices of the corrugations of the strips 36 at opposite sides of said honeycomb member 28 may engage and may be rigidly secured to the side walls 32 and 34 to form additional separate outwardly opening triangular-shaped cells 41 that are approximately one-half the size of the diamond-shaped cells 40. Preferably the length of the preformed honeycomb member 28 is such relative to the inside diameter of the retainer ring 26 that the ends of said honeycomb member will firmly abut each other in end to end relation after said member 28 is inserted within the ring 26. Thus no separate fixtures are required to hold said ends together when the member 28 is inserted into the ring 26.

Referring to FIGURE 6, it will be noted that the abutting opposite ends of the honeycomb member 28 are preferably cut at complementary angles extending diagonally across said member from one side edge to the other thereof to form a continuous diagonal line of contact therebetween, as at 42. This arrangement provides a much more dependable connection between the ends of the honeycomb member than would be had if the ends were cut straight across at right angles to the longitudinal median line of said member. Further, the honeycomb pattern is not disrupted at the abutting ends of the member 28. In fact, the honeycomb pattern or formation is uniform throughout the circumference of the annulus formed by the member 28.

The seal 20 is preferably assembled in the following manner:

The retainer ring 26 is preformed to the desired size and shape mentioned.

The initially straight elongated honeycomb member 28 is curved lengthwise in the arc of a circle by a rolling operation to the annular shape it is to assume in the retainer ring 26 of the seal assembly. Then, before being inserted within the retainer ring 26, the outer surface of said honeycomb member 28 is coated with a lacquer binder that in turn is subsequently provided with a coating of brazing compound in powder form. In fact, the curved honeycomb member 28 may be rolled in the brazing compound after the outer surface thereof has been coated with the lacquer binder so that the compound is picked up only by the lacquer coated outer surface thereof. Opposite ends of said curved member are also coated with lacquer and brazing compound, and if desired, alternate apices of the corrugations of the strips 36 at opposite sides of the curved member may likewise be coated with lacquer and brazing compound.

The curved coated honeycomb member 28 is then placed within the annular retainer ring 26, with the coated surface of said member against the base of the channel formation 30 of said ring, and with opposite ends of said member in abutting end to end relation. The honeycomb member 28 is then tack or spot welded at circumferentially spaced points thereof to the retainer ring 26 for attachment thereto, and the ends of said honeycomb member 28 are also tack or spot welded together for attachment to each other.

Subsequently, the entire seal assembly is placed in a suitable furnace wherein the temperature is raised sufficiently to reach the fusing temperature of the brazing compound. This causes the coated surface portions of the honeycomb member 28 to be permanently bonded to the retainer ring, and causes the ends of said member 28 to be permanently bonded to each other.

The temperature required for the operation described varies with the type of brazing compound used. A brazing composition of chrome, nickel and manganese has been found to require about 2100 degrees centigrade.

The resulting seal structure 20 is one which includes a multiplicity of small, separate, deep substantially diamond-shaped recesses or orifices provided with sharply defined multiple outer edges having good sealing characteristics and of thin dividing wall or partition construction for best heat dissipation.

The proposed seal is usable in axial flow turbines or compressors to prevent back flow along or any flow longitudinally of the turbine or compressor shaft. The retainer ring is preferably press-fitted to a receiving member within a suitable receiving recess; but is in all instances intended to be removable and replaceable. The outer exposed honeycomb surface of the member 28 is to be in closely spaced but non-contacting relation with the other relatively movable part of the seal receiving structure.

The seal disclosed may be used as an interstage sealing means where several are used, and are disposed between stators of an axial flow compressor or turbine wherein fluids are employed.

The seal is best used where pressure differentials are to be maintained. Such seal is not a contact seal, and relies upon the multiplicity of orifices having sharply defined outer edges to obtain the desired sealing effect.

For high temperature environments the retainer ring 26 and honeycomb member 28 would both be formed from stainless steel or like composition and would be brazed together as described. However, for low temperature conditions the retainer and honeycomb member could be made of a fibrous or plastic material and could be secured together by other suitable bonding or adhesive substances.

What I claim as my invention is:

1. The method of manufacturing a replaceable labyrinth type seal assembly; comprising the steps of making a ring of channel-shaped cross section and of predetermined diameter having the channel thereof opening radially, making a substantially annular honeycomb member of predetermined length having free ends and having a radial thickness greater than the depth of said channel with the cells thereof extending radially, assembling the substantially annular member and ring by placing said ring and member concentrically one within the other and then radially flexing said member toward and within said channel so that the base of said channel will be in surface-to-surface engagement with the adjacent radially facing surface of said substantially annular member and said substantially annular member will project radially from said channel beyond the edges of the side walls thereof and so that the free ends of said substantially annular member will be in end to end abutting relation with each other, securing said radially facing surface of said substantially annular member to the base of said channel, and securing the abutting ends of said substantially annular member to each other.

2. The method of manufacturing a replaceable labyrinth type seal assembly; comprising the steps of making a ring of channel-shaped cross section and of predetermined diameter having the channel thereof opening radially, making an elongated substantially straight honeycomb member of predetermined length having free ends and composed of corrugated separately formed strips arranged in substantially parallel rows with the alternate apices of the corrugations of adjacent strips connected together and forming a multiplicity of separate cells and having a thickness, measured between the opposite surfaces of said member through which the cells extend, greater than the depth of said channel, curving said straight elongated honeycomb member lengthwise in the arc of a circle so that the cells thereof extend radially and so that the opposite free ends thereof are positioned adjacent each other to thereby provide a substantially annular member, assembling the substantially annular member and ring by placing said ring and member concentrically one within the other and then radially flexing said member toward and within said channel so that the base of said channel will be in surface-to-surface engagement with the adjacent radially facing surface of said member and said member will project radially from said channel beyond the edges of the side walls thereof with said strips disposed substantially at right angles to the base of the channel and so that the free ends of said member will be in end to end abutting relation with each other, permanently securing said radially facing surface of said substantially annular member to the base of said channel, and permanently securing the abutting free ends of said substantially annular member to each other.

3. The method defined in claim 1 including the steps, after assembly of the substantially annular member and ring and before permanently securing the radially facing surface of said member to the base of said channel and permanently securing the abutting free ends of said member to each other, of tack welding said substantially annular member at circumferentially spaced points thereof to said ring for attachment thereto, and tack welding together the abutting free ends of said substantially annular member for attachment to each other.

4. The method defined in claim 1, wherein the channel of said ring opens radially inwardly.

5. The method defined in claim 1, wherein the channel of said ring opens radially outwardly.

6. The method defined in claim 1, wherein the abutting ends of the substantially annular member are cut at complementary angles extending diagonally across said member from one side thereof to the other.

References Cited in the file of this patent
UNITED STATES PATENTS

| | | |
|---|---|---|
| 2,815,795 | Poel | Dec. 10, 1957 |
| 2,860,740 | Holland | Nov. 18, 1958 |
| 2,878,560 | Gier | Mar. 24, 1959 |

FOREIGN PATENTS

| | | |
|---|---|---|
| 793,886 | Great Britain | Apr. 23, 1958 |